(12) United States Patent
Lewit

(10) Patent No.: US 6,497,190 B1
(45) Date of Patent: Dec. 24, 2002

(54) CONFORMABLE COMPOSITE STRUCTURAL MEMBER AND METHOD THEREFOR

(75) Inventor: Scott M. Lewit, Indialantic, FL (US)

(73) Assignee: Compsys, Inc., Melbourne, FL (US)

( * ) Notice: Subject to any disclaimer, the term of this patent is extended or adjusted under 35 U.S.C. 154(b) by 17 days.

(21) Appl. No.: 09/867,203

(22) Filed: May 29, 2001

(51) Int. Cl.[7] .................................................. B63B 5/24
(52) U.S. Cl. ...................................... 114/357; 264/258
(58) Field of Search ........................... 114/357; 264/258

(56) References Cited

U.S. PATENT DOCUMENTS

| | | | | |
|---|---|---|---|---|
| 3,634,898 A | * | 1/1972 | Geiger | 114/357 |
| 4,695,501 A | * | 9/1987 | Robinson | 428/159 |
| 5,429,066 A | * | 7/1995 | Lewitt et al. | 114/357 |
| 5,908,591 A | * | 6/1999 | Lewitt et al. | 156/182 |

* cited by examiner

Primary Examiner—Jesus D. Sotelo
(74) Attorney, Agent, or Firm—Akerman Senterfitt

(57) ABSTRACT

A conformable composite reinforcing member (20) includes a cavity formed at least in part from a fabric layer (12) and at least a first foam core (16) and at least a second foam core (18) positioned within the cavity. The second foam core has a relatively higher rigidity than the first foam core. The first foam core is preferably made from an open cell or flexible foam and the second foam core is preferably made from a rigid open cell foam.

25 Claims, 3 Drawing Sheets

52 — FORM A CAVITY FROM A FABRIC LAYER, WHERE THE FABRIC LAYER IS PREFERABLY A REINFORCED FABRIC LAYER ATTACHED TO A NON-WOVEN FABRIC LAYER

54 — INSERT AT LEAST A FIRST FOAM CORE WITHIN THE CAVITY SUCH AS A SOFT FOAM STRIP

56 — INSERT AT LEAST A SECOND FOAM CORE WITHIN THE CAVITY, WHEREIN THE SECOND FOAM CORE IS RELATIVELY MORE RIGID THAN THE FIRST FOAM CORE

58 — INSERTING ANOTHER RELATIVELY FLEXIBLE FOAM CORE UNDERNEATH THE SECOND FOAM CORE

60 — LAMINATE THE COMPOSITE REINFORCING MEMBER INTO A LARGER COMPOSITE STRUCTURE SUCH AS A BOAT, WALL PANEL, TANK WALL STIFFENER, ETC.

CONFORMABLE COMPOSITE STRUCTURAL MEMBER AND METHOD THEREFOR

CROSS REFERENCE TO RELATED APPLICATIONS

Not applicable.

BACKGROUND OF THE INVENTION

1. Field of Invention

This invention relates to structural members and more particularly, to structural members made with foam exhibiting different rigidity and/or flexibility.

2. Description of the Related Art

Structural members for composite structures are commonly used in various applications such as cargo containers, vehicles, and boats. In the past, structural members have been developed using a variety of different technologies. One prior art technique for forming structural members for boat hulls uses plywood as the core of a sandwich laminate. The plywood acts to augment the structural properties of the fabric layer skins of the boat. Advantageously, plywood provides a low-cost means for providing structural rigidity. One significant drawback to working with plywood, however, is that it tends to decay significantly, often within five to seven years. Another drawback is the limited malleability of plywood for use in curved structures having small radii.

Another prior art technique for providing structural rigidity to composite structures makes use of a high-density structural foam core rather than a plywood core. The high-density structural foam is commonly formed from cross-linked PVC or very high-density urethane. Structural members having high-density structural foam cores and reinforced fabric skins commonly maintain their structural integrity for up to ten years. High-density structural foam is considerably more expensive than plywood, however, and is not cost effective to use in many applications, including boats. In addition, high-density foam, like plywood, is not sufficiently malleable or suitable for structural members requiring a tight curve. A tightly curved member made of foam or plywood is likely to crack or exhibit other structural defects when the structural member is positioned for example within a boat hull. These effects are due to strains on the outer curvature or stresses on the inner curvature of the member. For example, a relatively rigid structural member is disclosed in U.S. Pat. No. 5,429,066 to Lewit et al. which is assigned to the assignee of the present invention and herein incorporated by reference. The structural member disclosed in the '066 patent comprises a fabric layer having an outer woven fabric layer and an inner non-woven fabric layer with a single structural foam core attached. The non-woven fabric layer, such as a mat fiber layer, is attached to the reinforcing fabric layer. A structural foam is attached to the non-woven fabric layer on the side of the non-woven fabric layer opposite the reinforcing fabric by filling the interstices of the non-woven fabric layer. However, the Lewit '066 structure suffers from the inability to sufficiently bend for tight curvatures without deforming.

U.S. Pat. No. 5,908,591 to Lewit el al. concerns a composite structure having a structure similar to Lewit '066 . Significantly, however, the Lewit '591 composite structure does not make use of a second reinforcing fabric layer. Instead, penetration of the structural foam is controlled so as to leave an outer portion of the fabric layer of the cured composite structure substantially free of cured resin.

Thus, a need exists for a structural member which when laminated within a composite structure provides strength and rigidity, but is sufficiently malleable prior to lamination to allow for tight curvatures.

SUMMARY OF THE INVENTION

In a first aspect of the present invention, a method of forming a structural member comprises providing a cavity formed at least in part from a fabric layer and inserting at least a first foam core and a second foam core within the cavity. The second foam core preferably has a relatively higher rigidity than the first foam core and penetrates the fabric layer.

In another aspect of the present invention, a conformable composite reinforcing member comprises a cavity formed at least in part from a fabric layer and at least a first foam core and at least a second foam core positioned within the cavity, wherein the second foam core has a relatively higher rigidity than the first foam core.

In yet another aspect of the present invention, a method of forming a composite structure such as a boat comprises the steps of providing a structural member, confirming the structural member to a tight curvature of the composite structure, and hardening the structural member once it has conformed to the tight curvature.

BRIEF DESCRIPTION OF THE DRAWINGS

Having briefly described the invention, the same will become better understood from the following detailed discussion, read in conjunction with the drawings wherein:

FIG. 5 is a flow chart showing a method for making the structural member in accordance with the present invention.

DETAILED DESCRIPTION OF THE PREFERRED EMBODIMENTS

Figure 1:
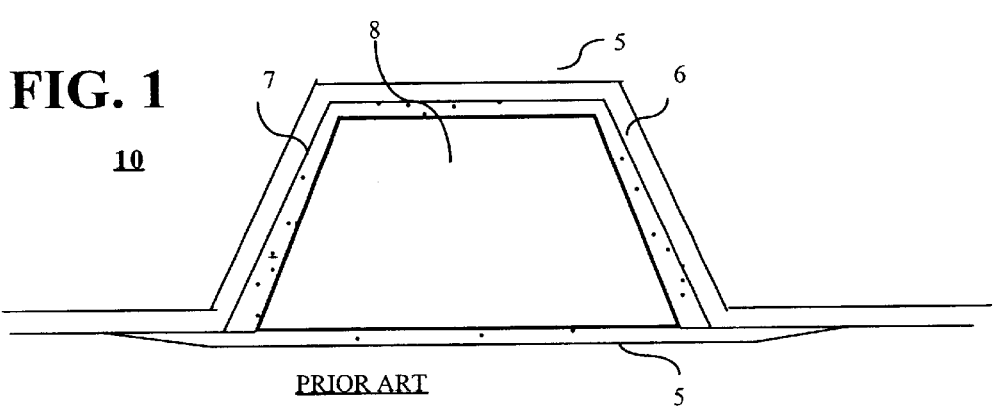
FIG. 1 is an existing structural member having a single foam core.

Referring to FIG. 1, an existing channel insert or beam 10 used in composite panels for boat transoms is shown. The beam 10 comprises a fabric layer 5 having an outer woven fabric layer 6 and an inner non-woven fabric layer 7 with a single structural foam core 8 attached.

Figure 2:
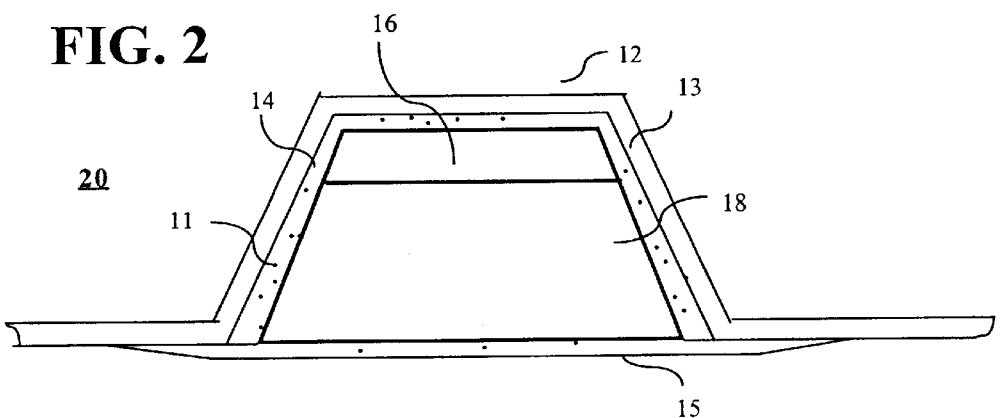
FIG. 2 is a cross-sectional view of a structural member in accordance with the present invention.
Figure 3:
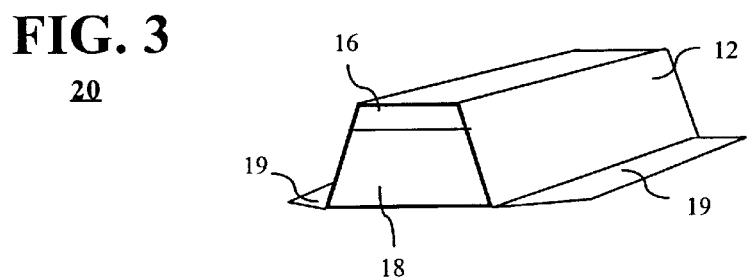
FIG. 3 is a perspective view of the structural member of FIG. 2.

FIGS. 2—3 illustrate a construction for a conformable structural member 20 in accordance with an aspect of the present invention. The conformable structural member 20 has a composite structural foam core comprising at least a first foam core 16 preferably made of a relatively lower density foam and at least a second foam core 18 preferably made of a relatively higher density foam. In another aspect of the present invention, the first foam core 16 is preferably made of a relatively more flexible foam than the second foam core 18 and the second foam core 18 is preferably made of a relatively more rigid foam than the first foam core 16. The first foam core 16 and the second foam core are located within a cavity formed at least in part from a fabric layer 12. The second foam core 18 preferably penetrates and attaches to the fabric layer 12. Preferably, the fabric layer 12 is comprised of a reinforcing fabric layer 13 securely attached to a non-woven fabric layer 14 forming an outside layer of the structural member 20. In this respect, the second foam core 18 preferably fills interstices 11 of the non-woven fabric layer 14 without penetrating into the reinforcing fabric layer 13. The reinforcing member 20 may also include a fabric layer 15 below the second foam core 18. The fabric layer 15 is preferably a non-woven fabric and could be made of the same material as non-woven fabric 14. Alternatively, the fabric layer 15 could be formed of the same materials as fabric layer 12. As shown in FIG. 3, the conformable composite reinforcing member 20 when used in construction of composite structures may also comprise a plurality of fabric flaps 19 positioned around the outer edges of the fabric layer 12 of the panel to permit the reinforcing member 20 to be laminated into the construction.

Using two types of foams within the structural member 20 as described above provides several advantages over using a single foam. A single rigid foam core would likely crack or exhibit other structural defects when the structural member is shaped into a tight curve and a single soft or flexible core would likely kink or likewise exhibit other structural defects when shaped into a tight curve. Although not necessarily required for the present invention, the rigid or higher density foam core 18 as described above provides the additional benefit of adhering to the fabric layer 12 without requiring any further adhesives. The foam core 18 also generally allows the structural member 20 to hold its shape when formed into curves such as those found in boat construction.

The fabric layer 12 is preferably formed from a reinforcing fabric layer and a non-woven inner fabric layer as previously explained, but may alternatively be formed from just a single fabric layer composed of fiberglass mat for example. The reinforcing fabric layer 13 can be formed of any suitable reinforcing fibers. However, the reinforcing fabric layer 13 is preferably a plurality of directional reinforcing fabric layers of organic or inorganic structural reinforcing fabrics such as fiberglass, carbon fibers, aramid fibers such as is available under the name Kevlar, linear polyurethane or polypropylene fibers such as is available under the name Spectra, or polyester fibers. By reinforcing fabric is meant a fabric which when added to a composite material enhances the structural properties of the material. The fabrics can be randomly oriented, or preferably; can be oriented in one or more directions. While a number of specific types of materials have been given for use as the reinforcing fabric layer 13, it will be appreciated by those of ordinary skill in the art that other equivalent-type reinforcing fabric layers can be employed in the practice of the invention.

According to a preferred embodiment, the fabric layers can be formed and attached to the foam cores 18 as described in U.S. Pat. Nos. 5,429,066 and 5,908,591 to Lewit, which disclosures are expressly incorporated herein by reference. As disclosed in the '066 patent, an inner fabric layer 14 of fabric layer 12 can be a non-woven fabric composed of continuous thermoplastic fiber, needle punched together to yield a felt-like fabric. One example of such a fabric is Trevira Spunbond, which is commercially available from Hoechst Celanese Corporation. However, the invention is not limited in this regard and the inner fabric layer may be comprised of other materials, including polyester staple mat and glass fiber mat, as well as other organic and inorganic fiber mats and fabrics.

Preferably the foam core 16 is a resilient foam strip that can be placed within a mold underneath the fabric layer 12. The foam core 18 is preferably formed of a self-expanding, self-curing urethane foam of a higher density than the foam core 16. The foam core 18 preferably expands and penetrates into the interstices 11 of an inner one (14) of the fabric layers 12 by filling into a mold in an amount sufficient to cause pressure as a result of expansion of the foam. Such self-rising, self-curing foam is preferably a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. However, the invention is not limited in this regard, and any other suitable self-expanding structural foam can be used for this purpose. It should also be understood that either foam core can be made from a self-rising, self-curing foam (that may or may not penetrate the fabric layers 12) within contemplation of the scope of the claimed invention so long as one foam core has a rigidity or a flexibility that is greater than the other foam core.

As an alternative, the fabric layer 12 can be attached or fitted to structural foam cores 16 and 18 by any other suitable means. For example, adhesives, stitching, clamps and suitably designed clips can also be used to attach the fabric layers 12 to the foam cores. Thus, the invention is not limited to the specific attachment method disclosed in the Lewit '066 and '591 patents.

Figure 4A:
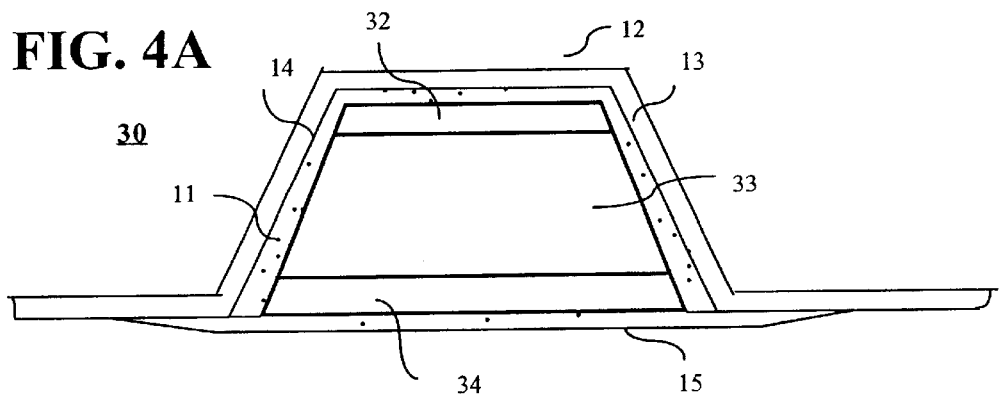
FIG. 4A is a cross-sectional view of another structural member in accordance with the present invention.
Figure 4B:
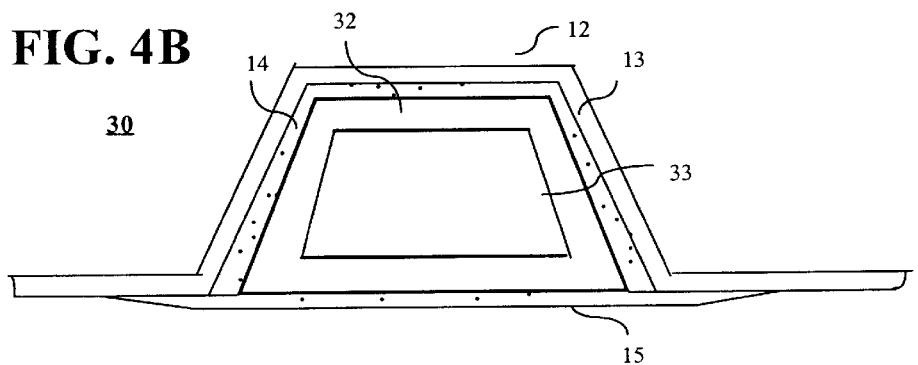
FIG. 4B is a cross-sectional view of another structural member in accordance with the present invention.

Those skilled in the art will appreciate that the structural member 20 as described herein can serve in a wide variety of applications requiring tight curvatures such as boats or tank stiffeners. Referring to FIG. 4A, another conformable structural member 30 is shown. As in the prior structural members described, structural member 30 comprises a fabric layer defining a cavity. Within the cavity, a first foam core 32 and another foam core 34 is provided both having a relatively lower density than a second foam core 33 which is placed intermediate to foam cores 32 and 34. This alternative structure would have additional flexibility due to the relatively lower density foam cores on opposing sides. In yet another alternative, FIG. 4B illustrates a similar conformable structural member 30 with a slightly different internal structure. As in the prior structural members described, structural member 30 comprises a fabric layer defining a cavity. Within the cavity, a first foam core 32 is provided having a relatively lower density than a second foam core 33 which is placed within foam core 32. This alternative structure would have additional flexibility due to the more flexible foam core (32) surrounding the more rigid foam core (33). Of course, other similar structures are contemplated within the scope of the present invention including concentric foam cores where the inner core could be rigid foam and an outer core could be flexible foam surrounded by fabric layers or where the inner core is flexible foam and the outer core is relatively more rigid, yet flexible enough to be malleable for the purposes described herein.

Referring to FIG. 5, a method 50 of forming a structural member in accordance with the present invention is shown. Although the following steps are described in a preferred order, the scope of the invention should not be limited with respect to the order in which these steps are taken. In step 52, a cavity is formed at least in part from a fabric layer. The fabric layer is preferably formed from fabric layers constructed by attaching a reinforcing fabric layer to a non-woven fabric layer forming an upper outside layer and mating the upper outside layer with another non-woven fabric layer forming a lower outside layer, wherein the upper outside layer and the lower outside layer form an outside layer. The fabric layer can be placed in a mold shaped as a channel or trough to create the cavity.

The fabric layer can be composed of directional reinforcing fabric layers of organic or inorganic structural reinforcing fabrics consisting of fiberglass, carbon fibers, aramid fibers, linear polyurethane fibers, polypropylene fibers, polyester fibers or any combination thereof. The fabric layer is ideally formed from fabric layers constructed by attaching a reinforcing fabric layer to a non-woven fabric layer forming as previously explained. The non-woven fabric layer can be composed of continuous thermoplastic fiber, needle punched together to yield a felt-like fabric. Optionally, the non-woven fabric layer can be composed of materials selected from the group including polyester staple mat, glass fiber mat, or other organic and inorganic fiber mats and fabrics.

Next, at least a first foam core is inserted within the cavity at step 54. Step 54 can comprise the step of feeding a soft foam strip into a mold. The first foam core is preferably more flexible (such as low density urethane) than a second form core that is inserted within the cavity at step 56. Step 56 can comprise the step of injecting the second foam core underneath the soft foam strip. Preferably, the second foam core is of a relatively higher density or of a greater rigidity than the first foam core and penetrates the non-woven fabric layer as it expands and cures. The second foam core is preferably formed of a self-expanding, self-curing urethane foam which has been caused to expand into the interstices of an inner one of the fabric layers by having been filled into a mold in an amount sufficient to cause pressure as a result of expansion of the foam cores to penetrate into the interstices of the inner one of the fabric layers. It should also be understood that both the first and second foam cores can be inserted or injected within the cavity at the same time. The method 50 may optionally further comprise the step 58 of inserting another soft foam strip underneath the second foam core, forming a hard foam core sandwiched between two soft foam strips within the cavity. Optionally, at step 60, the composite reinforcing member has an exposed reinforcing fabric layer that is laminated into a larger composite structure such as a panel or transom for a boat, tank wall stiffener, cargo container, truck side panel or wall panel, among other composite structures. Such composite structures are shown in FIGS. 6–8.

Figure 6:
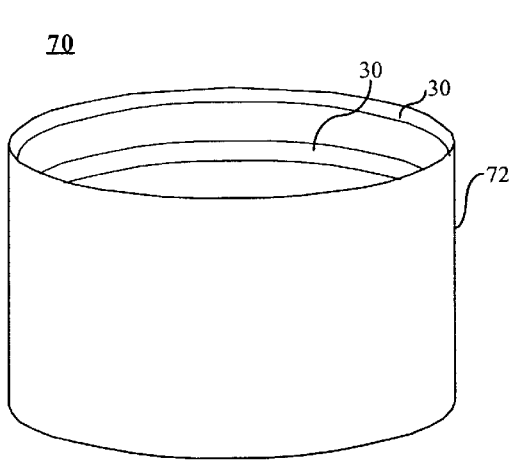
FIG. 6 is a perspective view of a composite structure using a structural member in accordance with the present invention.
Figure 7:
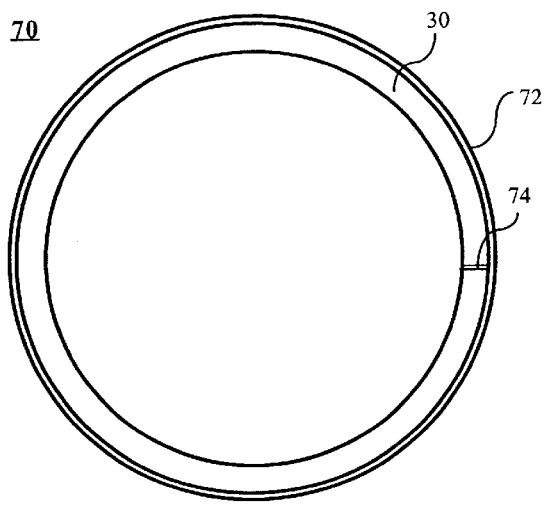
FIG. 7 is a top view of the composite structure of FIG. 6 in accordance with the present invention.

Referring to FIG. 6 and FIG. 7, perspective and top plan views respectively of a composite structure 70 (in the form of a tank) requiring a tight curvature using at least one structural member 30 is shown. A skin 72 is formed on the periphery of the tank. The skin can be a fiberglass mat which is wet out with resin at the same time as the structural member 30. The structural member(s) preferably serve as stiffeners and maintain the integrity of the composite structure 70. The ends 74 of structural member(s) 30 are placed together to preferably form a circle or other shape as may be desired. The structural member 30 (as previously described) preferably comprises a cavity formed at least in part from a fabric layer wherein a first foam core is inserted with the cavity and at least a second foam core is inserted within the cavity, the second foam core having a relatively higher rigidity than the first foam core, wherein the second foam penetrates the fabric layer. The structural member is made to conform to the tight curvature of the composite structure. Once the structural member is conformed to the tight curvature, the structural member is hardened in place. This can be achieved by wetting out the structural member with resin and allowing the resin to cure.

Figure 8:
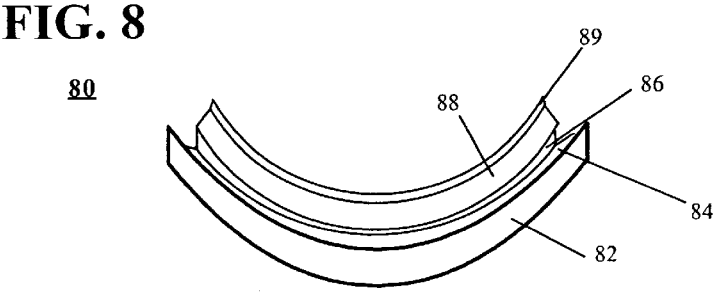
FIG. 8 is a side view of a boat hull mold and the accompanying components for a boat hull in accordance with the present invention.

Referring to FIG. 8, another composite structure 80 is shown in the form of a boat hull. Preferably, a boat hull is formed by providing a mold 82 having a tight curvature as shown and applying a layer of gel coat 84 on the mold. On the layer of gel coat 84, a layer of fiberglass mat 86 is preferably applied. As with the tank of FIGS. 6 and 7, a structural member 88 is made to conform to the tight curvature of the composite structure 80. In this instance, the structural member is placed above the fiberglass mat 86. Again, the structural member 88 and ideally the fiberglass mat 86. are wet-out with resin wherein the resin is allowed to cure.

Although the present invention has been described in conjunction with the embodiments disclosed herein, it should be understood that the foregoing description is intended to illustrate and not limit the scope of the invention as defined by the claims.

What is claimed is:

1. A method of forming a structural member, comprising the steps of:

providing a cavity formed at least in part from a fabric layer;

inserting at least a first foam core within the cavity; and inserting at least a second foam core within the cavity, the second foam core having a relatively higher rigidity than the first foam core, wherein the second foam penetrates the fabric layer.

2. The method of claim 1, wherein the fabric layer is formed from fabric layers constructed by attaching a reinforcing fabric layer to a non-woven fabric layer forming an outside layer.

3. The method of claim 2, wherein the second foam core only penetrates the non-woven fabric layer.

4. The method of claim 2, wherein the reinforcing fabric layer is an exposed reinforcing fabric layer that is laminated into a larger composite structure.

5. The method of claim 2, wherein the non-woven fabric layer is composed of materials selected from the group including polyester staple mat, glass fiber mat, or other organic and inorganic fiber mats and fabrics.

6. The method of claim 2, wherein the second foam core is formed of a self-expanding, self-curing urethane foam which has been caused to expand into the interstices of an inner one of the fabric layers by having been filled into a mold in an amount sufficient to cause pressure as a result of expansion of the foam cores to penetrate into the interstices of the inner one of the fabric layers.

7. The method of claim 2, wherein the fabric layer is formed from fabric layers constructed by attaching a reinforcing fabric layer to a non-woven fabric layer forming an upper outside layer and mating the upper outside layer with another non-woven fabric layer forming a lower outside layer, wherein the upper outside layer and the lower outside layer form an outside layer.

8. The method of claim 1, wherein outer fabric layer of the structural member further comprises fabric flaps.

9. The method of claim 1, wherein the first foam core is made of a flexible open cell urethane and the second foam core is made of a rigid closed cell urethane.

10. The method of claim 1, wherein the fabric layer is selected among the group of directional reinforcing fabric layers of organic or inorganic structural reinforcing fabrics consisting of fiberglass, carbon fibers, aramid fibers, linear polyurethane fibers, polypropylene fibers, or polyester fibers or any combination thereof.

11. The method of claim 1, wherein the second foam core is an MDI-based rigid polyurethane foam (methylene-diphenyl-methane diisocyanate) using "hydrogenated chlorofluorocarbons" (HCFC), water and/or $CO_2$ as a blowing agent.

12. The method of claim 1, wherein the step of inserting at least a first foam core comprises the step of feeding a soft foam strip into a mold.

13. The method of claim 12, wherein the step of inserting at least a second foam core comprises the step of injecting the second foam core underneath, above, within, or around the soft foam strip.

14. The method of claim 12, wherein the step of inserting at least a first foam core further comprises the step of inserting another soft foam strip underneath the second foam core, forming a rigid foam core sandwiched between two soft foam strips within the cavity.

15. A method of forming a conformable composite reinforcing member, comprising the steps of:
  providing a cavity formed at least in part from a fabric layer by attaching a reinforcing fabric layer to a non-woven fabric layer forming an outside layer;
  inserting at least a first foam core within the cavity; and
  inserting at least a second foam core within the cavity wherein the second foam core is more rigid than the first foam core and wherein the second foam core penetrates the non-woven fabric layer.

16. The method in accordance with claim 15, wherein the composite reinforcing member has an exposed reinforcing fabric layer that is laminated into a larger composite structure.

17. A conformable composite reinforcing member, comprising:
  a cavity formed at least in part from a fabric layer;
  at least a first foam core located within the cavity; and
  at least a second foam core positioned within the cavity, wherein the first foam core and the second foam core have relatively different rigidity or density.

18. The conformable composite reinforcing member of claim 17, wherein the fabric layer is constructed by attaching a reinforcing fabric layer to a non-woven fabric layer forming an outside layer.

19. The conformable composite reinforcing member of claim 18, wherein the second foam core fills interstices of the non-woven fabric layer without penetrating into the reinforcing fabric layer.

20. The conformable composite reinforcing member of claim 17, wherein the second foam core surrounds the first foam core and has a relatively higher rigidity than the first foam core.

21. The conformable composite reinforcing member of claim 17, wherein the second foam core surrounds the first foam core and has a relatively lower rigidity than the first foam core.

22. A method of forming a composite structure requiring a tight curvature using at least a structural member, comprising the steps of:
  providing the structural member wherein the structural member comprises a cavity formed at least in part from a fabric layer wherein a first foam core is inserted with the cavity and at least a second foam core is inserted within the cavity, the second foam core having a relatively higher rigidity than the first foam core, wherein the second foam penetrates the fabric layer;
  conforming the structural member to the tight curvature of the composite structure;
  hardening the structural member once the structural member is conformed to the tight curvature.

23. The method of claim 22, wherein the method of forming a composite structure comprises the method of forming a boat hull.

24. The method of claim 23, wherein the step of forming a boat hull and hardening the structural member within the boat hull comprises the steps of providing a mold having a tight curvature, providing a layer of gel coat on the mold, providing a layer of fiberglass mat on the gel coat, conforming the structural member to the tight curvature of the composite structure layered above the fiberglass mat, wetting out the structural member with resin, and allowing the resin on the structural member to cure.

25. The method of claim 22, wherein the method of forming a composite structure comprises the method of forming a tank.

* * * * *

UNITED STATES PATENT AND TRADEMARK OFFICE
CERTIFICATE OF CORRECTION

PATENT NO.    : 6,497,190 B1
DATED         : December 24, 2002
INVENTOR(S)   : Lewit It is certified that error appears in the above-identified patent and that said Letters Patent is hereby corrected as shown below:

<u>Column 7,</u>
Line 22, replace "12" with -- 13 --

Signed and Sealed this

Twenty-first Day of October, 2003

JAMES E. ROGAN
*Director of the United States Patent and Trademark Office*